United States Patent

Jung et al.

[19]

[11] Patent Number: 6,038,232
[45] Date of Patent: Mar. 14, 2000

[54] MPEG-2 MULTIPLEXER FOR ATM NETWORK ADAPTATION

[75] Inventors: Dong-Bum Jung; Jong-Hyup Lee, both of Daejeon, Rep. of Korea

[73] Assignees: Electronics and Telecommunications Research Institute, Daejeon; Korea Telecom, Seoul, both of Rep. of Korea

[21] Appl. No.: 08/848,868

[22] Filed: May 1, 1997

[30] Foreign Application Priority Data

Oct. 16, 1996 [KR] Rep. of Korea ....................... 96-46202

[51] Int. Cl.[7] .................................................. H04L 12/28
[52] U.S. Cl. ..................... 370/395; 348/564; 348/845.2; 348/7; 348/8; 348/12; 348/403; 348/441; 370/392; 370/260; 370/474; 370/355; 370/442; 370/402
[58] Field of Search ............................... 370/395, 473, 370/390, 347, 392, 442, 397, 469, 474, 260, 355, 402, 516, 399, 423; 348/845.2, 426, 8, 7, 12, 564, 476, 403, 441

[56] References Cited

U.S. PATENT DOCUMENTS

| | | |
|---|---|---|
| 5,371,547 | 12/1994 | Siracusa et al. . |
| 5,448,568 | 9/1995 | Delpuch et al. . |
| 5,796,441 | 8/1998 | Oshita .................................... 348/845.2 |
| 5,847,771 | 12/1998 | Cloutier et al. .......................... 348/564 |
| 5,856,975 | 1/1999 | Rostoker et al. ..................... 348/845.2 |

FOREIGN PATENT DOCUMENTS

WO 96/08115   3/1996   WIPO .

OTHER PUBLICATIONS

Dong–Bum Jung, Yeong–Weon Hwang and Hun Kang, A design and applications of integrated and interactive MPEG–2 video system over ATM environments, 7th International Workshop on Packet Video, Mar. 18–19, 1996 Brisbane, Australia, pp. 67–70.

*Primary Examiner*—Michael Horabik
*Assistant Examiner*—Prenell Jones
*Attorney, Agent, or Firm*—Jacobson, Price, Holman & Stern PLLC

[57] ABSTRACT

A moving picture expert group (MPEG)-2 transport stream (TS) multiplexer for an asynchronous transfer mode (ATM) network adaptation. The MPEG-2 multiplexer for ATM network adaption includes media and timer processor, TS packet multiplex controller, buffer, and ATM network adaptation processor. The media and timer processor is initialized by an external clock and reset signal, receives signals DATA, WRITE and each module selection signal CHPSEL from an external processor to store the header of each TS packet, generates a TS packet by receiving data from a video/audio encoder, and thereby drives a timer with the clock signals. The TS packet multiplex controller multiplexes each TS packet provided from the media and timer processor or outputs an input/output controlling signal to multiplex. The buffer buffers TS-PDU transmitted from the TS packet multiplex controller. The ATM network adaptation processor processes a network adaptation using ATM adaptation layer type 5 to transmit the TS-PDU output to the ATM network.

4 Claims, 4 Drawing Sheets

MPEG-2 MULTIPLEXER FOR ATM NETWORK ADAPTATION

BACKGROUND OF THE INVENTION

1. Field of the Invention

The present invention relates to a moving picture expert group (MPEG)-2 transport stream (TS) multiplexer for an asynchronous transfer mode (ATM) network adaptation and, more particularly, to a multiplexer which multiplexes MPEG-2 video and MPEG-1 audio signals for real time transmission and their ATM network adaptation.

2. Discussion of Related Art

For using the MPEG-2 audio/video (A/V) signals in a real time communication, a transport stream in the system layer (TS) is required. The system layer of the MPEG-2 can be output through two streams. First, a program stream (PS) is for the error-free situation, and has no restriction in length. Second, the TS is for the real time transmission. The length of TS is fixed to 188 bytes and has 4 byte header and 184 byte payload.

To retrieve the MPEG-2 A/V data in the receiver side, not only the data information but also the timing information has to be built in the program clock reference (PCR) packet and at least transmitted once per 0.1 second. Program map table (PMT) packet and program association table (PAT) packet are transmitted to denote the extra channel information. The input of the MPEG-2 TS multiplexer is originally formatted in the form of packetized elementary stream (PES). The length of the PES may be varied or fixed.

In case of the A/V PES, the data stream of 184 byte unit is input to the TS multiplexer, and 4 byte header is added to TS payload. Therefore, 188-byte A/V TS is generated and transmitted to the ATM adaptator. In case of the PCR packet, a timer formed in the TS multiplexer is used for the packet multiplexing. In case of PMT packet and PAT packet, table data are stored by a local processor during the initialization, the packets are transmitted to the ATM adaptator after being processed in the TS multiplexer by the timer.

An ATM cell of 53 octet is used for providing the services of fixed bit rate in B-ISDN. TS and PS provided by MPEG-2 system are used for receiving MPEG A/V data in B-ISDN. But, in the communication environment, only MPEG-2 TS can be used. This TS is composed of a 4-byte header and a 184-byte payload, so that it can communicate through an interface with a communication network. Originally, the TS is designed for ATM adaptation layer 1 (AAL 1). However, the TS is currently recommended to be used for AAL5. Accordingly, for adapting the 188-byte TS multiplexed with the MPEG A/V signals to the ATM network, an 8-byte AAL5 trailer is added to the two successive TSs (188×2). And in case of structuring this into 48-byte AAL5-PDU, the 8 ATM cells are made and transmitted to ATM network.

A structure of a protocol data unit (PDU) of the AAL5 protocol is formed in a manner that the PTI bit value of the ATM header is set for "0" in the first/middle PDU part, and set for "1" if the last trailer is included, through a payload type indication (PTI) of the ATM header. Therefore, the original TS boundary can be found out and retrieved at the receiving part.

Conventionally, in designing the MPEG-2 TS multiplexer, the number of the A/V packet is counted to transmit the PCR packet, but in this case the cell loss in the ATM network is not considered.

SUMMARY OF THE INVENTION

Accordingly, the present invention is directed to an MPEG-2 TS multiplexer for ATM network adaptation that substantially obviates one or more of the problems due to limitations and disadvantages of the related art.

An object of the present invention is to provide an MPEG-2 TS multiplexer which employs PMT and PAT buffers having a simplified interface using FIFO, and transmits PCR packet using a timer under consideration of the cell loss in the ATM network, in case of multiplexing the MPEG-2 video and MPEG-1 audio streams with PCR, PMT, PAT packets to transmit them in a fixed bit rate, thereby transmitting them to the ATM network.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the invention includes: a media and timer processing means for storing media, PCR packet, PMT packet and PAT packet provided from a video/audio encoder, adding the TS header thereto, and then outputting them according to a timer; a TS packet multiplex controlling means for multiplexing the TS packet and controlling the packet's output; a buffer means for storing the TS packet output from the TS multiplexer for an ATM network adaptation; and an ATM adaptation means for processing the packet with AAL5 protocol to make it into an ATM cell, thereby transmitting it to ATM network.

It is to be understood that both the foregoing general description and the following detailed description are exemplary and explanatory and are intended to provide further explanation of the invention as claimed.

BRIEF DESCRIPTION OF THE ATTACHED DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION OF PREFERRED EMBODIMENT

Reference will now be made in detail to the preferred embodiments of the present invention, examples of which are illustrated in the accompanying drawings.

Figure 1:
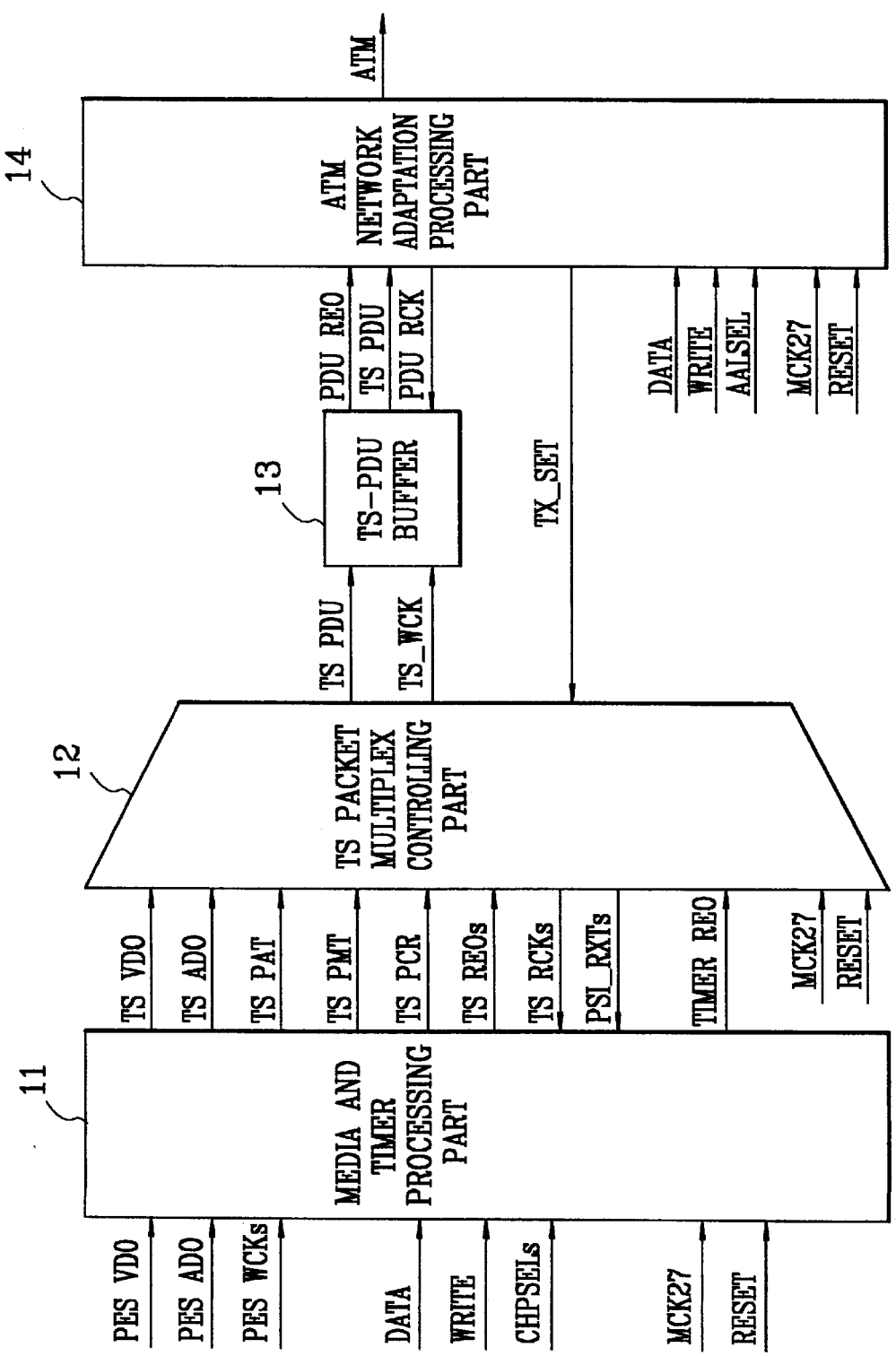
FIG. 1 illustrates the structure of an MPEG-2 TS multiplexer for ATM network adaptation of the invention.

As illustrated in FIG. 1, an MPEG-2 TS multiplexer for the ATM network adaptation receives clock signal MCK27 and reset signal RESET from outside and provides every signal required for ATM network adaptation of the TS packet. First, a media and timer processing part 11 sets a TS header value according to the signals DATA, WRITE, CHPSELs (VDOSEL, ADOSEL, PCRSEL, PMTSEL, PATSEL) provided from an external processor controlling part, stores the PES-VDO and PES-ADO data provided from a video/audio encoder according to signals VDO-WCK and ADO-WCK, receives signals TS-REQs (VDO-REQ, ADO-REQ, PMT-REQ, PAT-REQ) which are input to a TS packet multiplex controlling part 12, and then outputs them according to the output scheduling algorithm.

In case of outputting the PAT and PMT packets, the signals PAT-RTX and PMT-RTX are input to each buffer using the retransmission function of the FIFO. The packets TS-PMT and TS-PAT are output and stored in a TS-PDU buffer 13 through the signals PAT-RCK and PMT-RCK. If an ATM network adaptation processing part 14 is notified that there is the TS packet to be transmitted through signal PDU-REQ, the TS-PDU and PDU-RCK are transmitted to the ATM network adaptation processing part 14. The thus-formed ATM cell is transmitted to the network.

ATM network adaptation processing part 14 sets the ATM header value according to the signals DATA, WRITE, CHPSELs (AALSEL) provided form the external processor controlling part. The ATM network adaptation processing part 14 is described in Korean Patent No. 95-55917.

Figure 2:
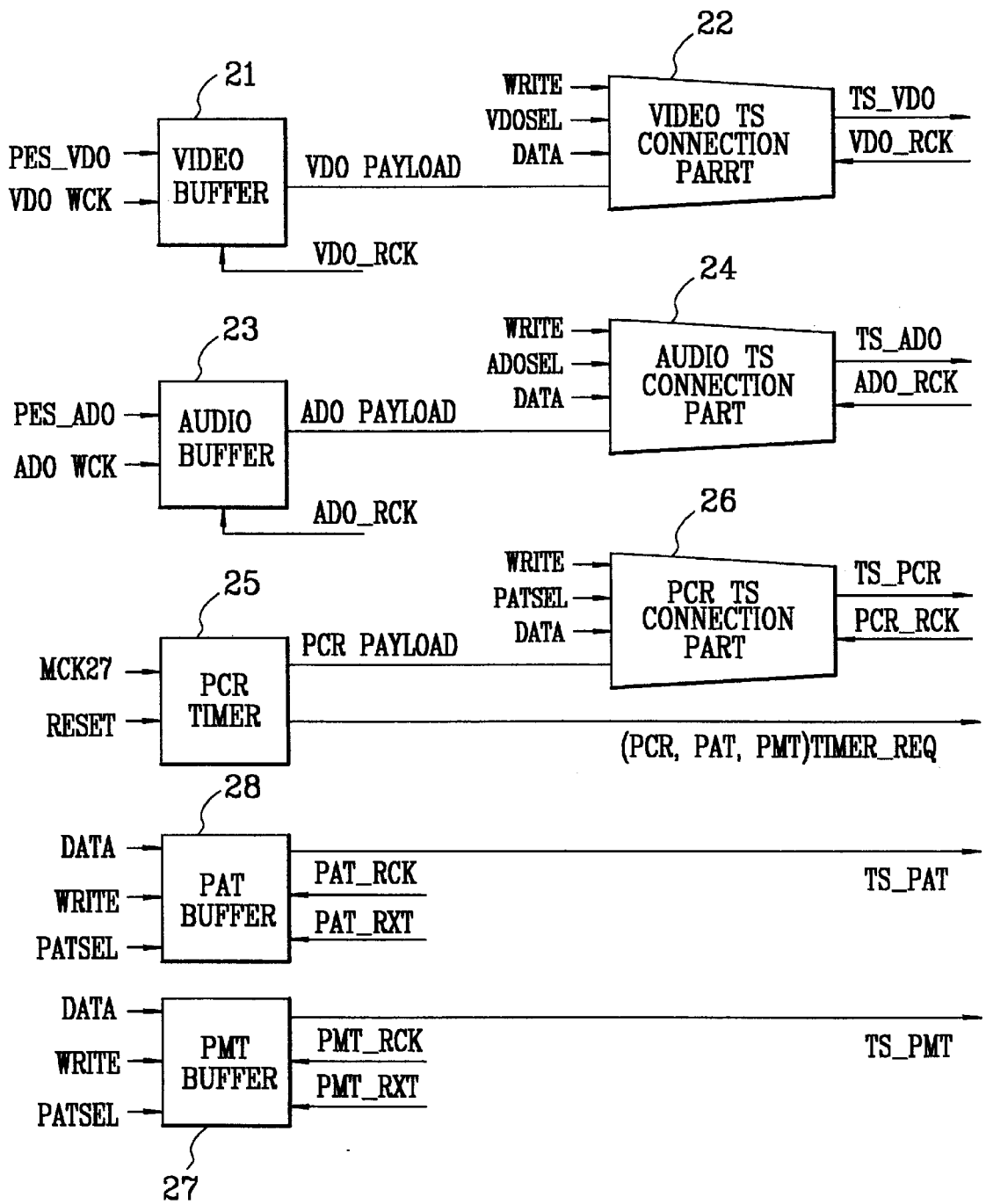
FIG. 2 is a detailed diagram of a media and timer processing part of the invention.

As illustrated in FIG. 2, the media and timer processing part of the invention includes a video buffer 21, a video TS connection part 22, an audio buffer 23, an audio TS connection part 24, a PCR timer 25, a PCR TS connection part 26, and a PAT buffer 28.

PES-VDO data provided from the video encoder are stored in the video buffer 21 according to the VDO-WCK signal.

The video TS connection part 22 made up with four parallel registers (TS video header buffers) and a multiplexer stores the data in the TS video header buffer according to the signals WRITE and VDOSEL provided from the external processor controlling part. The part 22 adds VDO-PES (184 bytes) of the video buffer 21 to the TS video header (4 bytes) stored in the TS connection part 22 according to the signal VDO-RCK provided from the TS packet multiplex controlling part 12. And then, the part 22 transmits the TS-VDO data to the TS packet multiplex controlling part 12.

The data PES-ADO provided from the audio encoder are stored in the audio buffer 23 according to the signal ADO-WCK.

The audio TS connection part 24 made up with four parallel registers (TS audio header buffer) and a Multiplexer stores data in the TS audio header buffer according to the signals WRITE and ADOSEL provided from the external processor controlling part, adds the ADO-PES (184 bytes) of the audio buffer 23 to the TS audio header (4 bytes) stored in the TS connection part 24 according to the signal ADO-RCK provided from the TS packet multiplex controlling part 12 and transmits the data TS-ADO to the TS packet multiplex controlling part 12. The PCR timer circuit 25 operated with the external clock signal MCK27 and reset signal RESET is made up with the registers for storing the PCR value from the counter circuit and the counter output.

The transmission of PCR packet should be performed once per 0.1 second. Therefore, if the signal PCR-REQ is provided to the TS packet multiplex controlling part 12 through a signal TIMER-REQ within 0.05 second in consideration of the cell loss of ATM network, the PCR packet is transmitted with the optimal priority. As the transmission time with respect to the PAT and PMT packet is not fixed, after one second passes, the TIMER-REQ successively notifies the signals PMT-REQ and PAT-REQ to the TS packet multiplex controlling part 12, so that the TS-PMT and TS-PAT packets are transmitted to the TS packet multiplex controlling part 12.

PCR data are made up with the base field 33 bits and extension field 9 bits, divided into 5 bytes and transmitted to the PCR TS connection part 26.

The PCR TS connection part 26 made up with four parallel registers (TS PCR header buffer), five parallel registers (PCR field register) and a multiplexer, stores data in the TS PCR header buffer according to the signals WRITE and PCRSEL provided from the external processor controlling part, adds the 5-byte PCR payload to the TS PCR header (4 bytes) stored in the PCR TS connection part 26 according to the PCR-RCK signal provided from the TS packet multiplex controlling part 12, and transmits the TS-PCR data to the TS packet multiplex controlling part 12.

The PMT buffer 27 made up with FIFO stores the 188-byte PMT data in the PMT buffer 27 according to the signals WRITE and PMTSEL provided from the external processor controlling part, and transmits the data TS-PMT to the TS packet multiplex controlling part 12 according to the signal PMT-RCK provided from the TS packet multiplex controlling part 12. The PAT buffer 28 made up with the FIFO stores the 188-byte PAT data in the PAT buffer 28 according to the signals WRITE and PATSEL provided from the external processor controlling part, and transmits the data TS-PAT to the TS packet multiplex controlling part 12 according to the PAT-RCK signal provided from the TS packet multiplex controlling part 12.

Figure 3:
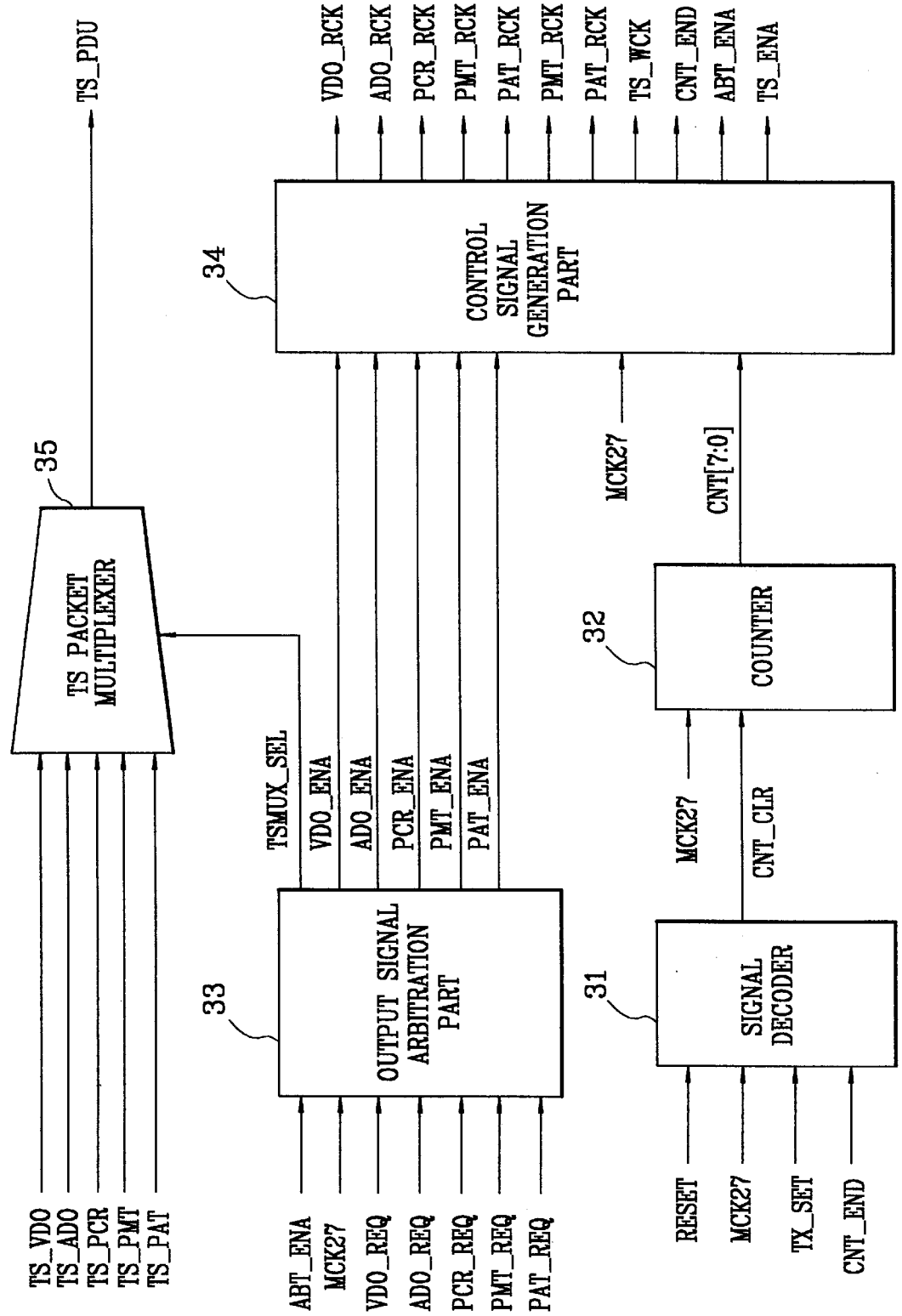
FIG. 3 is a detailed diagram of a TS packet multiplex controlling part of the invention.

As illustrated in FIG. 3, the TS packet multiplex controlling part 12 of the invention receives the external clock signal MCK27 and reset signal, initializes each circuit and starts to operate through the clock and control signal. A signal decoder 31 made up with the logic circuit and a flip-flop in the initialization, receives the signal TX-SET output after setting the ATM header from the ATM network adaptation processing part 14, inputs the signal CNT-CLR into "1" from "0" to a counter circuit 32, so that after starting the counting operation, the signal decoder 31 is cleared through the signal CNT-END output from the control signal generation part 34 when the counting of the limited counter area ends. Here, the signal CNT-CLR of the signal decoder 31 is converted from "1" to "0", and then back to "1" at the next clock signal, thereby continuing the counting operation. The counter circuit 32 made up with the 8 bit counter operates according to the clock signal MCK27 and the signal CNT-CLR, and provides the CNT (7:0) which is the 8 bit counter value to the control signal generation part 34.

An output signal arbitrating part 33 made up with the register, logic circuit and status machine, is initialized through an ABT-ENA which is the arbitrating circuit control signal provided from the control signal generation part 34, determines what to output among the TS packet signals TS-REQs (VDO-REQ, ADO-REQ, PCR-REQ, PMT-REQ, PAT-REQ) provided from the media and timer processing part 11 in case the ABT-ENA is effective, provides one ENA signal among the VDO-ENA, ADO-ENA, PCR-ENA, PMT-ENA, PAT-ENA signals in case the corresponding TS packet signal is output to the control signal generation part 34, inputs a signal TSMUX-SEL for deciding the path of the TS packet to be output to the TS packet multiplexer 35, thereby controlling the output of the TS packet.

A detail operation of the device will be described below with reference to FIG. 4.

The control signal generation part 34 is the logic circuit which receives VDO-ENA, ADO-ENA, PCR-ENA, PMT-ENA, PAT-ENA signals from the external clock signal MCK27 and output signal arbitrating part 33. For example, in case that only VDO-ENA is valid and output by "1", the part 34 combinates the TS-ENA signal indicating the length of 188 bytes, the clock signal MCK27, and VDO-ENA signal, and then provides the VDO-RCK signal to the VIDEO buffer 21 and the video TS connection part 22 to thereby input the TS-VDO packet output signals to the TS packet multiplexer 35. The output signal arbitrating part 33 outputs the TSMUX-SEL signal corresponding to the valid VDO-ENA signal to thereby output the TS-VDO packet to the TS-PDU, and stores it in the TS-PDU buffer 13 together with the TS-WCK signal.

Meanwhile, in case the PMT-ENA is valid, the part 34 applies the PMT-RTX requiring the retransmission to the FIFO in which the PMT buffer 27 is formed, and provides the signal PMT-RCK through the combination of the clock signal MCK27, PMT-ENA, and TS-ENA signals to the PMT-buffer 27 to thereby input the TS-PMT packet to the TS packet multiplexer 35. And then the output signal arbitrating part 33 outputs the corresponding signal TSMUX-SEL in case the signal PMT-ENA is valid to thereby output the TS-PMT packet to the TS-PDU, and stores it in the TS-PDU buffer 13 together with the signal TS-WCK.

Figure 4:
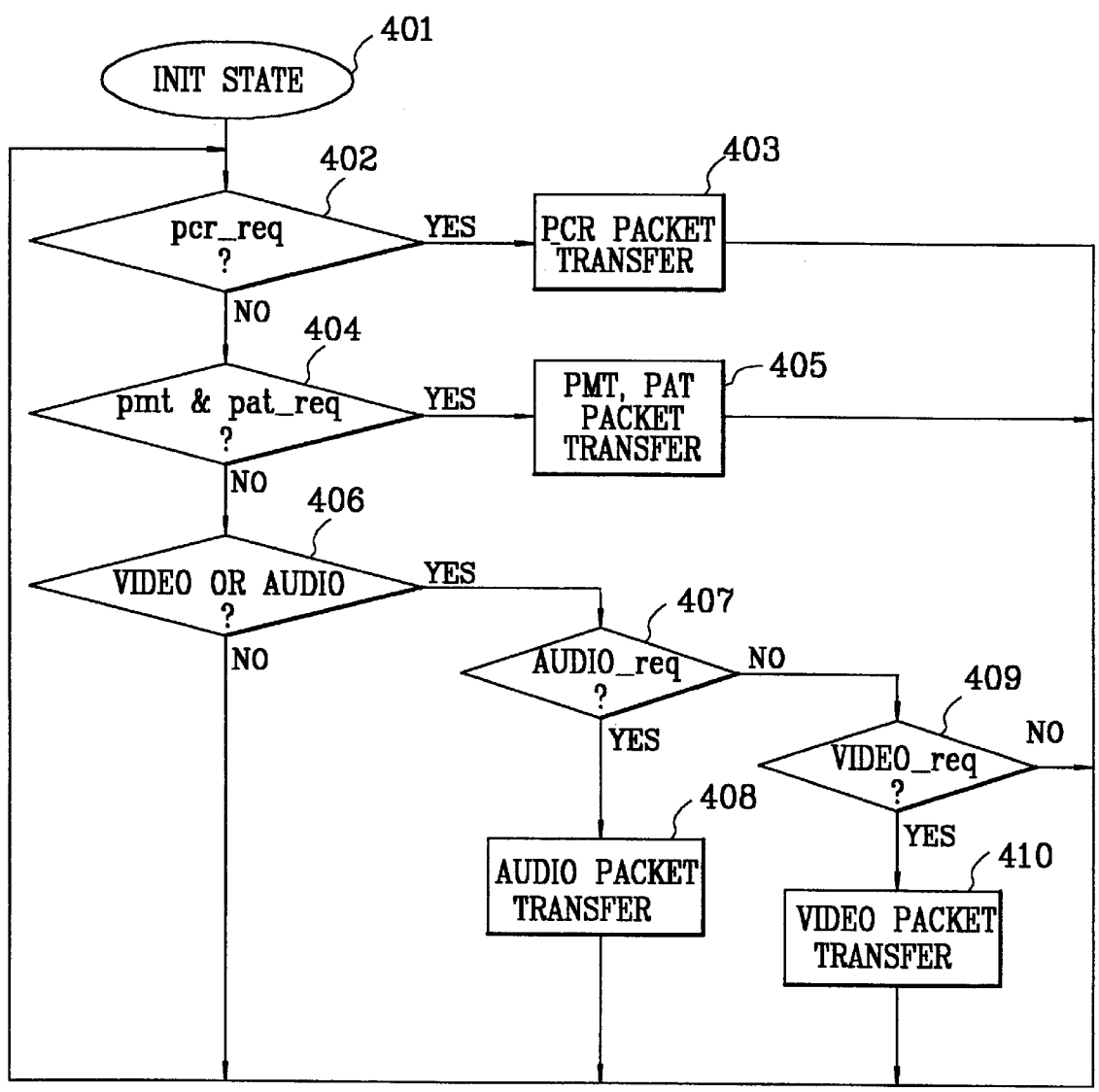
FIG. 4 is a flowchart of the TS packet multiplex controlling part of the invention.

FIG. 4 is the flow chart of the TS packet multiplex controlling part of the invention, and thus illustrates the steps in which each request with respect to each input is detected and then arbitrated in the output signal arbitrating part 33 to thereby determine which packet to output.

The initial state of the output arbitrator is indicated in step 401, determines if the signal PCR-REQ among the signals input to the output signal arbitrating part 33 in step 402, and outputs the TS-PCR packet of the PCR packet transfer block if there is the signal pcr-req signal in step 403. If not, a pmt & pat-req determines if there is the pmt-req or pat-req signal in step 404, and the TS-PAT and TS-PMT packets of the PMT and PAT packet transfer block are sequentially output in step 405 in case the signal is in the pmt & pat-req in step 404. If neither of the two signals is in the video or audio determination block in step 406, the operation returns to the step 401. But, if not, the audio-req determination block determines if the audio-req signal is input in step 407, and the audio packet transfer block transmits the TS-ADO packet in step 408. And if not, the operation moves to the video-req block in step 409. If there is no video-req signal, the operation returns to the init state in step 401. If there is the video-req signal, the video packet transfer block outputs the TS-VDO packet in step 410 and returns to the initial step 401.

In case of transmitting the MPEG-2 video and MPEG-1 audio streams of the invention, that is, transmitting the PCR packet with a fixed bit rate, a timer is used for transmitting in consideration of the cell loss of ATM network. And the PMT and PAT buffers are structured of FIFO, so that the TS multiplexer having the simple interface can be adapted to the ATM network in the real time.

It will be apparent to those skilled in the art that various modifications and variations can be made in the MPEG-2 TS multiplexer for an ATM network adaptation of the present invention without departing from the spirit or scope of the invention. Thus, it is intended that the present invention cover the modifications and variations of this invention provided they come within the scope of the appended claims and their equivalents.

What is claimed is:

1. An MPEG-2 multiplexer for ATM network adaptation, comprising:

media and timer processing means initialized by an external clock and reset signal, receiving signals DATA, WRITE and each module selection signal CHPSEL from an external processor to store the header of each TS packet, generating a TS packet by receiving data from a video/audio encoder, and thereby driving a timer with the clock signals;

TS packet multiplex controlling means for multiplexing each TS packet provided from the media and timer processing means or outputting an input/output controlling signal for a multiplexing;

buffer means for buffering TS-PDU transmitted from the TS packet multiplex controlling means; and ATM network adaptation processing means for processing a network adaptation using ATM adaptation layer type 5 to transmit the TS-PDU output to the ATM network.

2. The multiplexer as claimed in claim 1, wherein the media and timer processing means comprises:

video buffer means for storing data PES-VDO according to a signal VDO-WCK provided from an external video encoder and outputting a signal VDO-payload according to a signal VDO-RCK;

video TS connection means for storing the TS header according to signals WRITE, DATA and VDOSEL provided from an external processor controlling part, multiplexing the signals with a VDO-payload signal, and outputting a signal TS-VDO;

audio buffer means for storing data PES-ADO on basis of a signal ADO-WCK provided from an external audio encoder and outputting a signal ADO-payload according to a signal ADO-RCK;

audio TS connection means for storing a TS header on basis of the signals WRITE, DATA and ADOSEL provided from the external processor controlling part, multiplexing the signal ADO-payload, and outputting a signal TS-ADO;

timer means for receiving the external clock MCK27 and reset signal RESET and generating a signal TIMER-REQ notifying 0.05 second and 1 second;

PCR TS connection means for storing TS header on basis of the signals WRITE, DATA and PCRSEL provided from the external processor controlling part, multiplexing the signal PCR-payload and then outputting the signal TS-PCR;

PMT buffer means for storing PMT packet on basis of the signals WRITE, DATA and PMTSEL provided from the external processor controlling part, and outputting a TS-PMT packet according to the signal PMT-RCK; and PAT buffer means for storing PAT packet on basis of the signals WRITE, DATA and PATSEL provided from the external processor controlling part, and outputting a TS-PAT packet according to the signal PAT-RCK.

3. The multiplexer as claimed in claim 1, wherein the TS packet multiplex controlling means comprises:

signal decoder means for receiving the external clock and reset signal initially, receiving a signal CNT-END form a control signal generation part, and a signal TX-SET from the ATM adaptation processing part, and thereby controlling a counter;

counter means for counting by receiving a clear signal CNT-CLR and clock signal MCK27;

output signal arbitrating means for externally receiving the TS packet request signal, and determining and arbitrating the TS packet to be output according to the signal ABT-ENA provided form the control signal generation part;

control signal generation means for receiving a signal –ENA output from the output signal arbitrating means and generating an input/output and controlling signal required for the MPEG-2 TS multiplexer; and TS packet multiplex means for receiving the TS packet inputs according to a TSMUX-SEL provided from the output signal arbitrating means and outputting a signal TS-WCK together with the TS-PDU signal.

4. The multiplexer as claimed in claim 1, wherein the TS packet output signal arbitration means comprises:

init state means for initializing TS packet output signal in the initial condition;

pcr_req means for deciding whether the transmission request of PCR packet exists or not;

PCR packet transfer means for transmitting TS_PCR packet in the case of existing of the transmission request for PCR packet;

pmt and pat_req means for deciding whether the transmission request of PMT or PAT exists or not in the case of not existing of the transmission request for PCR packet;

PMT, PAT packet transfer means for transmitting TS_PMT and TS_PAT in the case of existing of the transmission request for PMT or PAT packet;

Video and Audio_req means for deciding whether the transmission request for Video or Audio packet exists or not in the case of not existing of PMT or PAT packet;

audio_req means for deciding whether the transmission request for Audio packet previously exists or not in the case of existing of transmission request for Audio or Video packet;

Audio packet transfer means for transmitting TS_ADO packet in the case of existing of transmission request for Audio packet;

video_req means for deciding whether the transmission request for Video packet exists or not in the case of not existing of transmission request for Audio packet;

video packet transfer means for transmitting TS_VDO packet in the case of existing of transmission request for Video packet.

* * * * *